United States Patent Office 3,072,692
Patented Jan. 8, 1963

3,072,692
ALUMINUM-FREE ALKYL TITANIUM TRIHA-
LIDES AND PROCESS FOR PRODUCING SAME
George L. Karapinka, Irvington, and Wayne L. Carrick,
East Brunswick, N.J., assignors to Union Carbide Corporation, a corporation of New York
No Drawing. Filed Dec. 31, 1959, Ser. No. 863,118
4 Claims. (Cl. 260—429.5)

This invention relates to the preparation of alkyl titanium trihalides. More particularly, the invention relates to the preparation of aluminum-free titanium trihalides and to the method for preparing same.

It is known that certain organo aluminum compounds in combination with transition metal halides catalyze the polymerization of ethylene and lower olefins in general at low pressures and temperatures to produce high molecular weight olefin polymers of high density. Such polymers, while possessing many desirable properties not possessed by the previously known polymers, do themselves possess certain disadvantages tending to limit their applicability in certain fields. In particular, these polymers, especially polyethylene, have what is considered a wide molecular weight distribution, as well as a significant amount of low molecular weight waxes and oils. Hence, considerable effort has been devoted to a search for other novel compositions, which not only polymerize such lower olefins to useful polymer, but also obviate the deficiencies existent in the organo aluminum-transition metal halide catalyzed polymers.

One group of particular transition metal halides found to be particularly desirable as a catalyst component is the lower alkyl titanium halides, such as are represented by the formula $RTiX_3$, wherein R is a lower alkyl group having up to about six carbon atoms and X is a halogen atom, preferably chlorine. Such compounds have been known to be prepared by the reaction of an aluminum alkyl compound with a titanium tetrahalide according to the reaction scheme

$$AlR_nX'_{(3-n)} + TiX_4 \rightarrow RTiX_3 + AlR_{(n-1)}X_{(3-n)}X'$$

wherein R is a lower alkyl radical, $n$ is an integer from 1 to 3, inclusive, and X and X' are halogens which may be the same or different. The reaction proceeds readily at ambient conditions without need of heat or catalysts. However, gentle heat is sometimes desirable to hasten the reaction. Of course, temperatures above the decomposition temperatures of the reactants or products must be avoided. Generally, temperatures of between about −20° C. to 60° C. are most desirable, although some reasonable variation from this range is possible, depending on the particular aluminum alkyl and the titanium tetrahalide employed.

Unfortunately however, the alkyl titanium trihalides prepared by this process always contain some aluminum compounds as impurities which heretofore have not been removable. For some applications of the alkyl titanium trihalides, this presence of aluminum impurities is not disadvantageous, but for other applications it is. Characteristically, olefin polymers produced at certain specific catalyst sites are different than those produced at other and differing catalyst sites. Thus, if more than one type of active catalyst site is present in a polymerization mixture, a broadened molecular weight distribution of the resulting polymer mass will result, which, as is known, has a detrimental effect of the properties of the polymer, particularly in its low temperature properties and crack resistance. Also, during copolymerization of different olefin monomers, each catalyst site yields a copolymer containing a characteristic proportion of the several monomers. Thus, with a catalyst system having differing catalyst sites, the resulting copolymeric mass will be mixtures of copolymers of different compositions. Hence, when the alkyl titanium trihalide is employed for the polymerization containing certain aluminum compounds present as impurities, there results in a mixture of differing catalyst sites, particularly when the other catalyst component is not the aluminum alkyl initially employed to prepare the alkyl titanium trihalide component. For such reasons and others as will be obvious, an aluminum-free alkyl titanium trihalide is desirable.

According to the present invention, we have now discovered that alkyl titanium trihalides can be prepared free of aluminum contamination in the process of reacting a mixture of a titanium tetrahalide with an alkyl aluminum compound, reducing the aluminum content to a low level, for instance, by distilling over the formed alkyl titanium trihalide, admixing the resulting mixture containing a low level of aluminum, such as the distillate from the distillation, with an amount of a halide of vanadium to form a complex with substantially all the aluminum compounds remaining in the distillate and thereafter distilling the resultant mixture to recover the aluminum-free alkyl titanium trihalide. By this process, we have found it possible to prepare an alkyl titanium trihalide having less than one part in ten million of aluminum as an impurity.

In this process, we particularly prefer to employ the lower alkyl aluminum compounds, wherein the alkyl group or groups are methyl or ethyl; these being the most stable and easiest to prepare. It is not critical, however, that alkyl aluminum compounds contain any certain number of alkyl groups; for instance, it can be a monoalkyl aluminum dihalide, a dialkyl aluminum halide or a trialkyl aluminum compound. We particularly prefer the trialkyl aluminum compounds, such as trimethyl aluminum and triethyl aluminum, as the alkyl aluminum reactant. Likewise, we prefer the titanium tetrachloride as the other reactant, it being the least expensive and most available tetrahalide.

The reaction between these components is slightly exothermic and if heat is employed, care should be taken that the reaction does not become uncontrollable, either by the use of adequate cooling means or by the slow addition of one reactant to the other. In this reaction, we prefer to operate in an inert organic liquid medium for the reaction, principally for ease of control. The use of such a medium gives a smoother and more reproducible reaction. Mineral oils and other inert high-boiling organic diluents are particularly advantageous because they are substantially non-volatile, so that upon distillation of the alkyl titanium trichloride, none of the diluent is distilled over to contaminate the product. While heavy mineral oil is preferred, any organic diluent inert to the reactants and products, such as high boiling hydrocarbons and chlorinated hydrocarbons, particularly the chlorinated aromatic liquids, can just as easily be used. Where there is no necessity of securing the alkyl titanium trichloride free of the organic diluent, or where it may be desired to carry out the reaction of the halide of vanadium in the same inert diluent, a more volatile organic diluent may also be used.

In order to best reduce the aluminum content in the reaction mass to a low level, we prefer to distill the alkyl titanium trihalide from the reaction mixture. Generally, for this operation, it is desirable to employ a complexing agent for the aluminum compounds. For this purpose, diphenyl ether serves very well, although other agents which react with or complex with the aluminum compounds can be used with equal efficiency. Such agents when employed, reduce the volatility of the aluminum compounds by complexing therewith to enable the alkyl titanium compound to be distilled. However, all presently known complexing agents exist in equilibrium mixtures, so that all of the aluminum is not tied up in the complex and some detectible amount always is distilled over with the alkyl titanium trihalide.

Amounts of the complexing agents are narrowly critical. While amounts of about one mole of the complexing agent per mole of aluminum in the reaction mass operate successfully, greater or lesser amounts can be employed. As is obvious, it is not even necessary that it be employed if it is desired to distill the mixture directly one or more times to successively reduce the aluminum content to a low level, i.e., to about 10 percent or less.

The cessation of reaction producing the alkyl titanium trihalide can be readily determined by trial or by observing the temperature of the reaction and noting when the exotherm ceases; the majority of the reaction is then terminated and, if employed, the entraining agent is then added for the distillation.

Distillation can be conducted at reduced pressures and/or elevated temperatures, provided that temperatures below the decomposition temperature of the product is employed, preferably below 60° C. Reduced pressures in the range of 2-5 mm. Hg are desirable in this distillation and permit the recovery of the alkyl titanium trihalide in a cold trap or other suitable condenser in the vacuum line.

Inasmuch as the complex of the aluminum compounds and the complexing agent is generally a reversible reaction and each of the components exists in equilibrium with the complex, some of the aluminum compounds always distill over with the alkyl titanium trihalide to serve as contamination thereof. Generally, we have found that this contamination will run from between one to seven percent by weight, even when a complexing agent, such as diphenyl ether, is employed. Without the use of complexing aids, distillation of the mixture may result in even higher concentrations of aluminum. While other methods for reducing the aluminum content to a low level, i.e., below about 10 percent, may occur to those skilled in the art, no method heretofore has been able to completely remove the aluminum compounds to the non-detectable amount we have now discovered. It is for this reason that the present invention is necessary if an aluminum-free alkyl titanium trihalide is desired in the polymerization of olefins.

In the process of this invention, we have found that any of the hydrocarbon-soluble halides of vanadium, such as vanadium tetrachloride, vanadium tribromide, vanadium oxytrichloride, vanadium pentafluoride and like compounds that exhibit some distinct solubility in hydrocarbons, can be used. The amount of the halide of vanadium employed in the operation of this invention is not narrowly critical, but it should be sufficient to form a complex with substantially all the aluminum compounds in the mixture. We have found that the vanadium compounds react irreversibly with the aluminum compounds present to form a non-volatile complex of the two so that the remaining alkyl titanium trihalide can be readily removed by distillation from the mixture without danger of contamination from aluminum compounds. Generally, about 1 to 3 moles of the halide of vanadium per mole of aluminum compound present in the crude mixture is sufficient to accomplish this. While greater amounts of the halide of vanadium can be used, it is undesirable since the excess can react with and, to a degree, destroy some of the alkyl titanium trihalide and, thereby, reduce the yield of products. Amounts less than about one mole per mole of aluminum can also be used, but again to a disadvantage, since only partial removal of the aluminum compounds will be effected, and the resulting alkyl titanium trihalide can still be contaminated with aluminum compounds carried over in the distillation. In this treatment, the vanadium compounds irreversibly occlude or coordinate the aluminum compounds which, thereby, become held in a non-volatile matrix or complex, either directly or by being reduced by the aluminum compound.

Distillation of the thus-formed mixture containing the precipitated aluminum and vanadium complex is readily conducted by heating or by reducing the pressure of the system, or both. We, particularly, prefer that the temperature of the system not be permitted to get much above 60° C. in order to avoid thermal decomposition of the product. However, the maximum operable temperature in each case depends on the particular alkyl titanium trihalide employed and such other operating variable as time of contact, use of diluents and the like.

By the use of vacuum in the order of 2-5 mm. Hg pressure, it is possible to maintain the mixture at ambient temperatures and recover the pure alkyl titanium trihalides in a cold trap or condenser in the vacuum line. The recovered product will generally contain less than one part per million of aluminum and quite often less than one part in ten million, as determined by the Morin test of aluminum as described by F. Feigl, "Qualitative Analysis by Spot Tests," page 113 (1939), Nordmann Publishing Company, Inc., New York, New York.

The following example is illustrative of this invention, but should not be construed as any limitation thereof.

*Example*

Thirty-three milliliters of titanium tetrachloride were mixed with 150 ml. of heavy mineral oil in a 250-ml., two-neck, round bottom flask through which nitrogen was continuously added. Trimethyl aluminum (10 ml.) was then added dropwise over a period of 20 minutes. The exotherm caused the temperature to rise from room temperature to 40° C. After the addition of the trimethyl aluminum was complete, 19 ml. of liquid diphenyl ether was added. After the mixture was cooled to room temperature, the methyl titanium trichloride was distilled at 2 mm. pressure and 25° C. into a receiver cooled in an acetone-Dry Ice bath. The yield of crude methyl titanium trichloride was 27 g. (53% of the theoretical amount) containing about 0.5 to 1.0 percent of aluminum compounds (calc. as $CH_3AlCl_2$).

For further purification, this methyl titanium trichloride was again distilled after the addition of 0.5 ml. to form the precipitate which will complex with the aluminum compounds and render it non-volatile. A final distillation (at 2 mm. pressure) gave a product (B.P. 25° C. @ 2 mm.) which showed a negative Morin test for aluminum (sensitivity 1 part in $10^7$).

We claim:

1. In the process for preparing alkyl titanium trihalides by reacting a mixture of a titanium tetrahalide with an aluminum trialkyl and thereafter reducing the aluminum content, the improvement which comprises adding to the crude alkyl titanium trihalide thus prepared, an amount of a hydrocarbon-soluble, inorganic halide of vanadium sufficient to form a complex with the aluminum compounds present and thereafter distilling the mixture to recover the alkyl titanium trihalide free of aluminum compounds.

2. The improvement as claimed in claim 1, wherein the halide of vanadium is employed in an amount between about 1 to 3 moles per mole of aluminum present.

3. The improvement as claimed in claim 2, wherein the halide of vanadium is vanadium tetrachloride.

4. The improvement as claimed in claim 2, wherein the distillation is effected at reduced pressures and at a temperature below about 60° C.

References Cited in the file of this patent

UNITED STATES PATENTS

| | | |
|---|---|---|
| 2,230,538 | Fenness et al. | Feb. 4, 1941 |
| 2,951,085 | Clauss et al. | Aug. 30, 1960 |

FOREIGN PATENTS

| | | |
|---|---|---|
| 553,477 | Belgium | Apr. 16, 1957 |
| 576,720 | Canada | May 26, 1959 |

UNITED STATES PATENT OFFICE
CERTIFICATE OF CORRECTION

Patent No. 3,072,692

January 8, 1963

George L. Karapinka et al.

It is hereby certified that error appears in the above numbered patent requiring correction and that the said Letters Patent should read as corrected below.

Column 3, line 6, after "are" insert -- not --.

Signed and sealed this 10th day of September 1963.

(SEAL)
Attest:

ERNEST W. SWIDER
Attesting Officer

DAVID L. LADD
Commissioner of Patents